Sept. 6, 1955     B. W. JEWELL     2,717,139
MOUNTING MEANS FOR ROOM AIR CONDITIONER
Filed Dec. 11, 1951     2 Sheets-Sheet 1
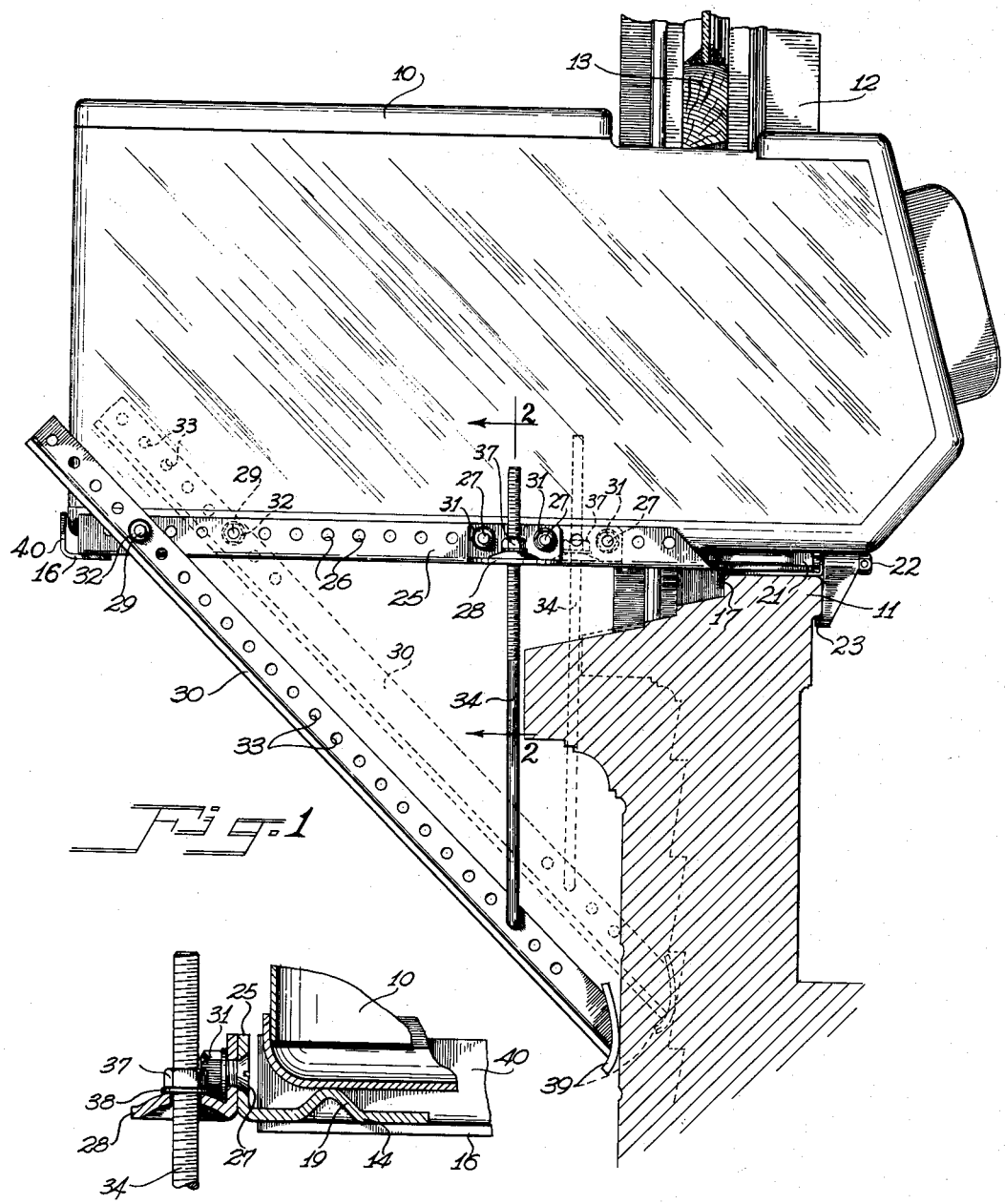
BERNARD W. JEWELL
INVENTOR.
BY Buckhorn and Cheatham
ATTORNEYS Sept. 6, 1955      B. W. JEWELL      2,717,139
MOUNTING MEANS FOR ROOM AIR CONDITIONER
Filed Dec. 11, 1951      2 Sheets-Sheet 2
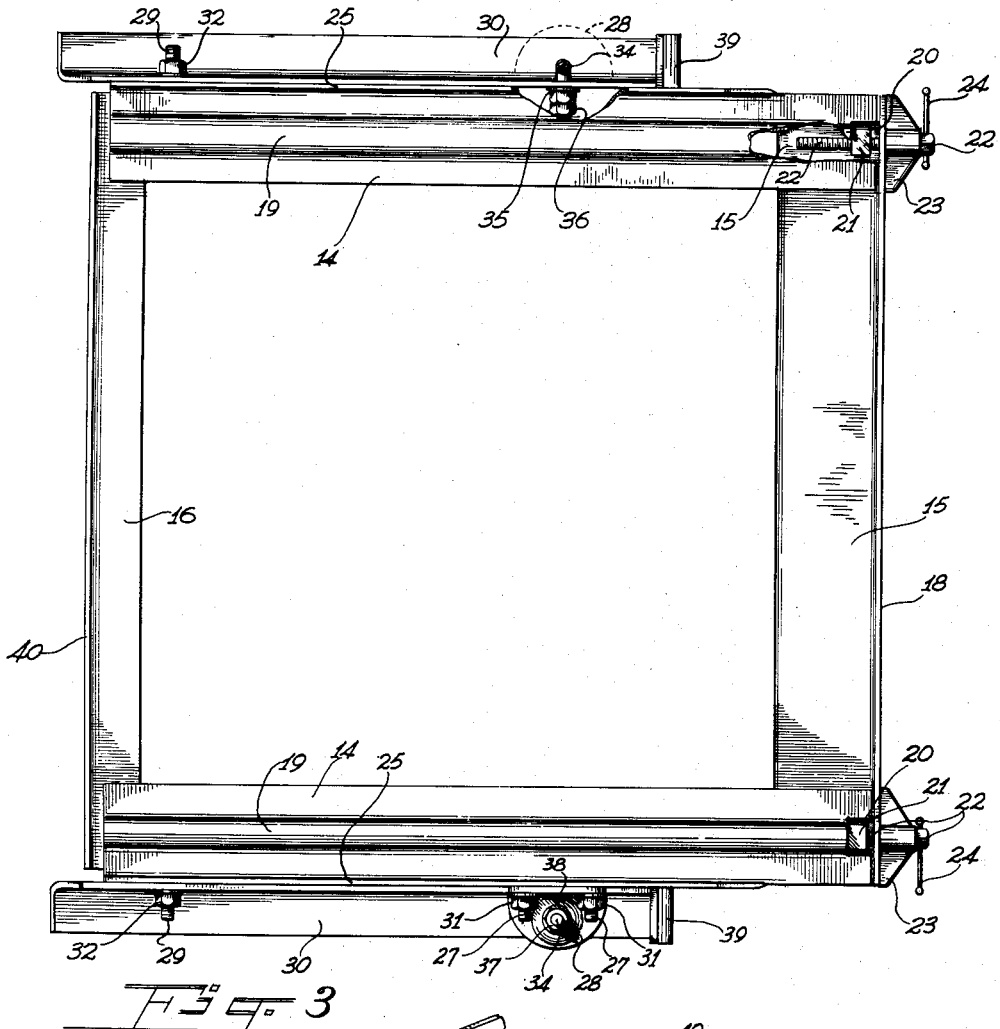
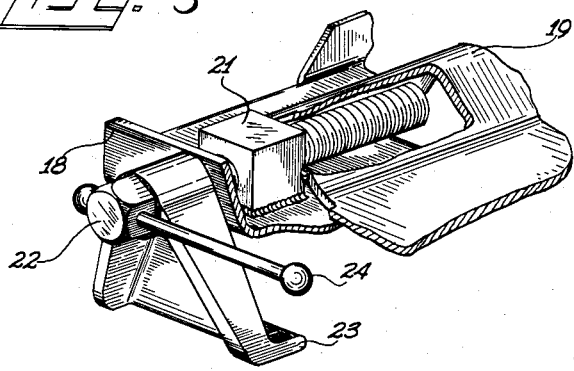
BERNARD W. JEWELL
INVENTOR.
BY Buckhorn and Cheatham
ATTORNEYS

United States Patent Office 2,717,139
Patented Sept. 6, 1955

2,717,139

MOUNTING MEANS FOR ROOM AIR CONDITIONER

Bernard W. Jewell, Wichita, Kans., assignor to The O. A. Sutton Corporation, Inc., Wichita, Kans., a corporation of Kansas Application December 11, 1951, Serial No. 261,000

1 Claim. (Cl. 248—208)

My present invention relates to mounting means for an air conditioning unit of the type which is placed on a window ledge and projects outwardly from the plane of the window. Air conditioning units of this type are relatively small and compact but nevertheless weigh a considerable amount since they contain at least one electric motor, a compressor and other metal parts, hence it is a problem firmly to support such a unit in a window opening. Heretofore it has been common practice to support the unit upon a structure built onto the window ledge or the wall of the building, this being unsatisfactory since in many cases it is desirable quickly to remove the entire assembly from the window opening. The present invention comprises means whereby a window unit may be firmly supported in such fashion that the unit may be quickly and easily withdrawn from the support, and the support may be quickly and easily associated with any type of window opening or dismounted therefrom.

An object of the present invention is to provide a window air conditioning unit mounting means which is made of relatively few, sturdy, easily constructed and assembled parts and which may be quickly adapted to conform to the shape of the window ledge, the thickness of the wall, and other physical elements of the opening in which the window unit is mounted.

The objects and advantages of the present invention will be more readily ascertained by inspection of the following specification taken in connection with the accompanying drawings, wherein like numerals refer to like parts throughout.

In the drawing,

Fig. 1 is a side view of an air conditioning unit mounted on mounting means of the present invention associated with a window opening;

Fig. 2 is a partial vertical section, on an enlarged scale, taken substantially along line 2—2 of Fig. 1;

Fig. 3 is a plan view of the window mount, with portions broken away to illustrate details thereof; and Fig. 4 is a view in perspective, on an enlarged scale, of a portion of the device with parts broken away for clarity.

In the present disclosure, a window unit 10 is illustrated, the unit being representative of many different types of units which may be mounted on mounting means constructed in accordance with the present invention. The unit is illustrated as being mounted in a window opening, defined in part by a window ledge 11 and sash guides 12, the unit projecting inwardly and outwardly from the plane of the window, with the upper window 13 being lowered onto the top of the unit to complete closure of the window opening. Side wings (not shown) may be associated with the unit in the event that the window opening is wider than the unit.

The present invention comprises a rectangular frame including side rails 14, a front rail 15 and a rear rail 16 rigidly secured together to define a platform upon which the window unit 10 may be positioned. Adjustable clamping means are associated with the frame whereby the inner end of the frame may be firmly secured to the window ledge 11. As illustrated herein, such means may conveniently be as follows: The front rail 15 preferably comprises a Z-shaped member having an outer flange 17 which turns downwardly to engage the outer surface of the window ledge 11 and an inner flange 18 which turns upwardly. The side rails 14 are provided with longitudinally extending ridges 19 upon which the unit may be slid into position, the front ends of which are cut away at 20 to provide openings in which nuts 21 may be fixedly secured. Clamp bolts 22 extend through suitable openings in the flange 18, threadedly engaging the nuts 21 and extending inwardly into the interiors of the ridges 19. Jaws 23 are loosely mounted upon the bolts 22 between the heads thereof and the flange 18 whereby the overhanging inner lip of the ledge 11 may be engaged and the platform firmly mounted by tightening the bolts 22. The heads of the bolts 22 are preferably provided with capstan bars 24 to facilitate operation of the bolts.

Each of the side rails 14 preferably comprises an angle bar having a vertically disposed outer flange 25 in which is provided a plurality of longitudinally spaced, countersunk openings 26 for reception of bolts 27 supporting a bracket 28 and an outer bolt 29 pivotally retaining a brace 30, the bolts 27 being retained by nuts 31 and the bolt 29 being retained by nut 32. The bracket 28 may be moved longitudinally of the side rail 14 to any desired position and likewise the pivotal connection of the brace 30 may be moved longitudinally of the side rail to any desired position. The brace 30 is preferably provided with a plurality of openings 33 whereby the relation of the brace to the side rail may be further adjusted. A tie rod 34 vertically connects an intermediate portion of the brace 30 to the bracket 28, the bracket 28 and tie rod being preferably positioned as close to the outer extremity of the window ledge as is possible. The tie rod 34 has a laterally bent, threaded lower end which extends through one of the openings 33 and is retained by a nut 35 and lock nut 36. A large part of the upper end of the tie rod is threaded and passes through an opening in the laterally extending flange of the bracket 28, being adjustably prevented from dropping therethrough by means of a nut 37 and washer 38 bearing upon the upper surface of the flange of the bracket. The braces 30 extend diagonally inward and downwardly into engagement with the exterior surface of the wall of the building beneath the window ledge, the inner ends thereof supporting curved shoes 39 which rest against the building surface and prevent gouging and marring thereof.

The frame is positioned in the window ledge and secured by tightening the clamping jaws 23 whereupon the brackets 28, pivot bolts 29 and tie rods 34 may be adjusted so as to cause the shoes 39 to engage the wall of the building with the braces 30 preferably extending at 45° to the wall. Thereafter, when the window unit 10 is slid into position, the weight of the unit will cause the shoes 39 to press firmly against the building, the overhanging weight of the unit being thereby securely supported. Preferably the flanges 25 of the side rails 14 extend upwardly above the ridges 19 to prevent sideslipping of the unit and preferably the rail 16 comprises an upwardly projecting flange 40 of sufficient height to engage the rear edge of the unit. As indicated in dotted outline in Fig. 1, the mounting means may be adjusted to different sizes and shapes of window ledges, and to different thicknesses of walls. The clamping jaws 23 may be made in different types so as to engage various window ledges, or the window ledge may be appropriately modified to accommodate a single type of jaw.

Having illustrated and described a preferred embodiment of my invention, it should be apparent to those skilled in the art that the invention permits of modification in arrangement and detail. I claim as my invention all such modifications as come within the true spirit and scope of the appended claim.

I claim:

A window mount for an air conditioning unit comprising a metal frame including side, front and rear rails defining a platform upon which the unit may rest, each of said side and rear rails comprising a substantially L-shaped member having a horizontal leg and a vertical leg extending upwardly from the horizontal leg, each of said side rails having an inverted V-shaped ridge formed therein whereby an air conditioning unit may be supported upon said ridges and will be confined upon said frame by the vertical legs of said side rails and said rear rail, said front rail comprising a wide, horizontal portion adapted to rest upon a window ledge and a downwardly directed flange adapted to engage the outside of the window ledge, adjustable clamping means mounted on said front rail comprising a pair of elongated, threaded rods each extending into one of the grooves provided by the ridges of said side rails, a pair of threaded blocks fixed to said front rail in alignment with said ridges and each cooperating with one of said elongated, threaded rods whereby said rods may be adjusted longitudinally with respect to said side rails, and hook means pivotally mounted on the outer end of said threaded rods and adapted for engagement with the inside of the window ledge whereby the frame may be clamped to a window ledge in outwardly projecting relation to the window opening, a pair of braces each pivotally connected along a horizontal axis to an outer portion of one of said side rails and projecting diagonally downward and inwardly therefrom to engage the outer surface of the wall beneath the window, a pair of brackets each secured to an intermediate portion of one of said side rails, a pair of vertical tie rods each pivotally connected to and connecting an intermediate portion of one of said braces to one of said brackets, said rails and said brackets comprising cooperating, releasable securing means whereby said brackets may be shifted longitudinally of said rails, said braces and said tie rods comprising cooperating, releasable securing means whereby said tie rods may be shifted to various relative positions with respect to said braces, each of said brackets comprising a horizontal portion having an aperture therethrough, and each of said tie rods comprising a threaded portion projecting through the aperture of its associated bracket, and a nut threadedly engaging said threaded portion and engaging the upper surface of said horizontal portion, said braces being independent of each other whereby said nuts may be independently adjusted to vary the angular relationship of one brace with respect to its associated side rail without affecting the other brace.

References Cited in the file of this patent

UNITED STATES PATENTS

| | | |
|---|---|---|
| 894,295 | Stoops | July 28, 1908 |
| 1,325,229 | Braund | Dec. 16, 1919 |
| 1,523,835 | Place | Jan. 20, 1925 |
| 1,601,471 | Fowler | Sept. 28, 1926 |
| 1,668,882 | Akimov | May 8, 1928 |
| 1,957,184 | Smith | May 1, 1934 |
| 2,195,540 | Owens | Apr. 2, 1940 |
| 2,562,619 | Kolodziej | July 31, 1951 |